Oct. 25, 1932.   L. LASOWSKY   1,883,987
MOVING PICTURE CAMERA
Filed May 11, 1929   4 Sheets-Sheet 1
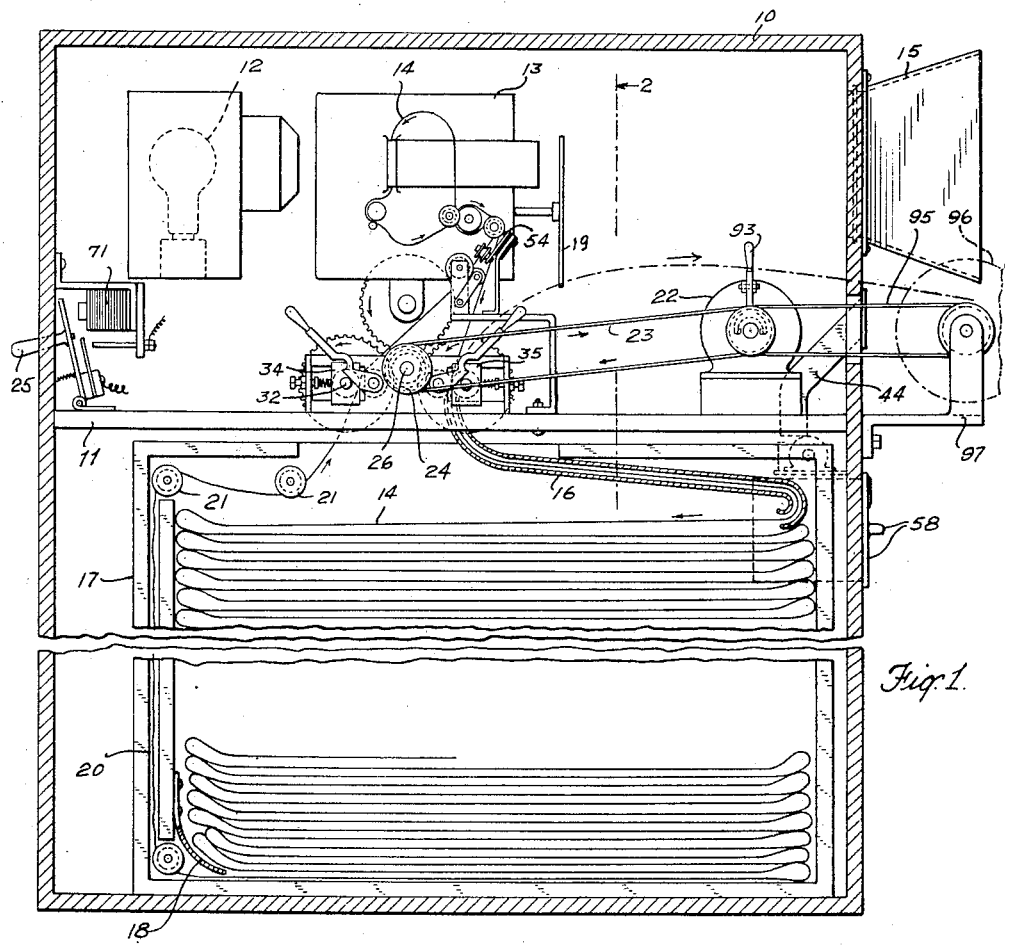
INVENTOR
LOUIS LASOWSKY
BY Blair Kilcoyne
ATTORNEY

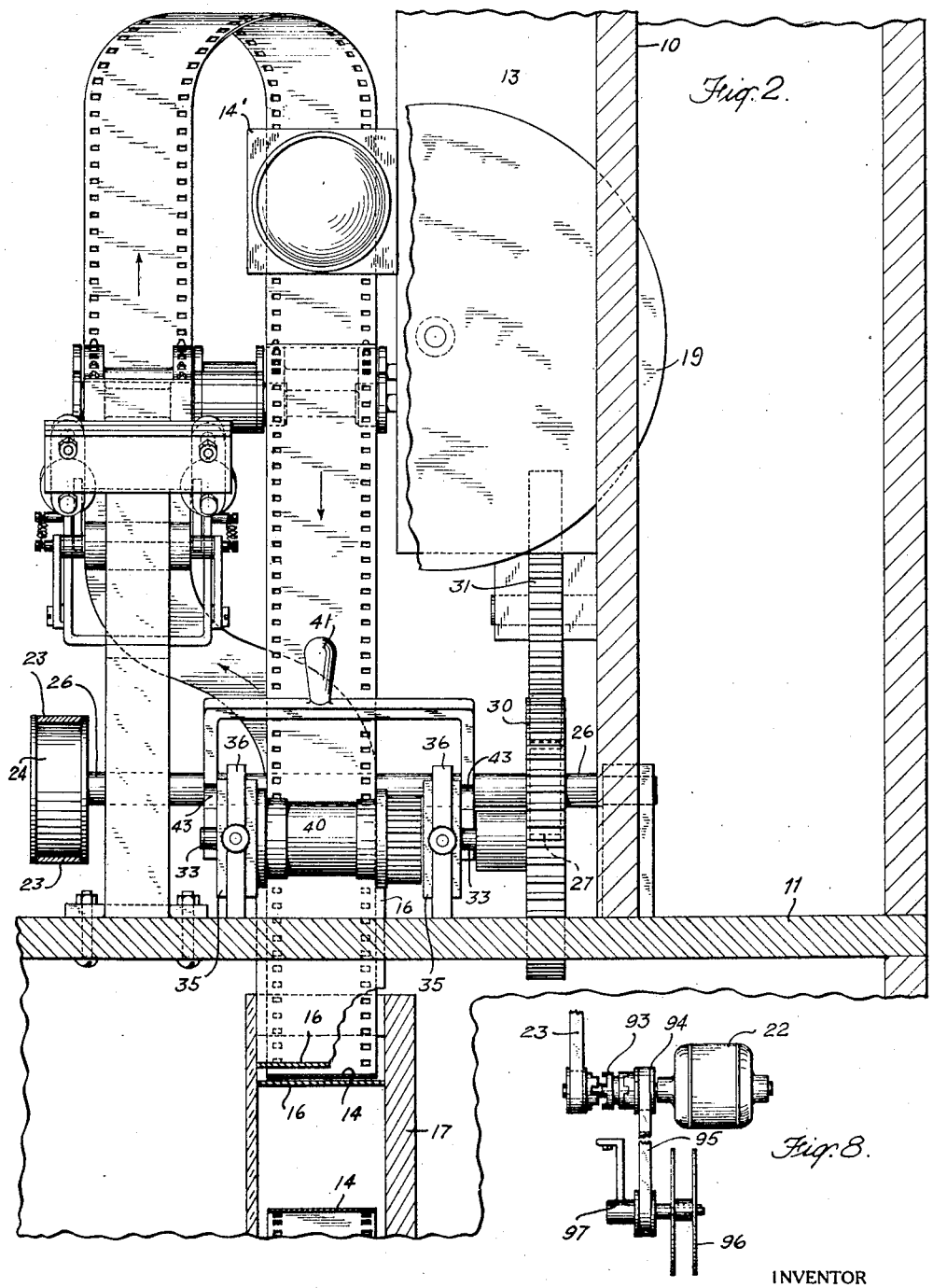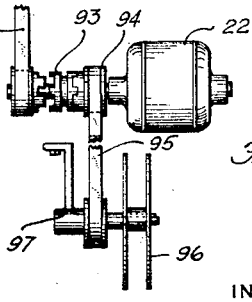

Oct. 25, 1932.                L. LASOWSKY                1,883,987
                          MOVING PICTURE CAMERA
                       Filed May 11, 1929          4 Sheets-Sheet 3
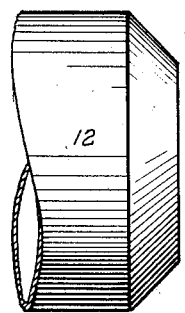
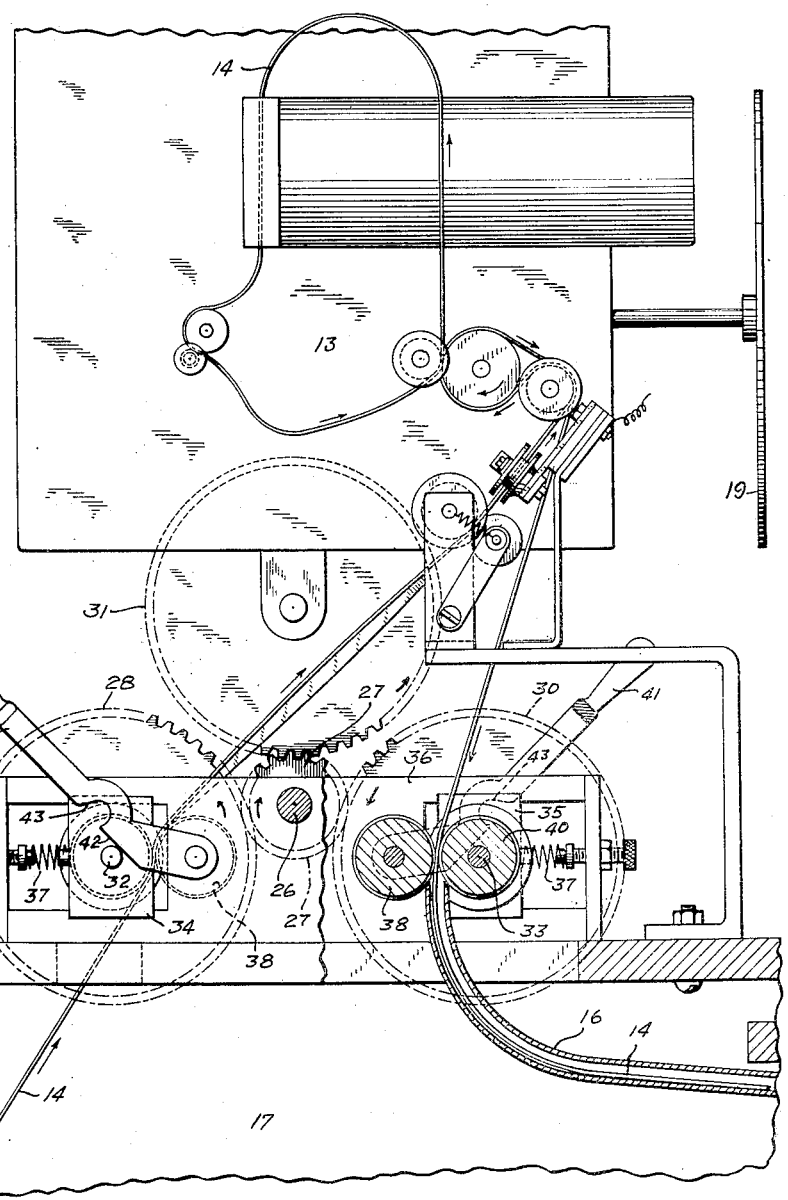
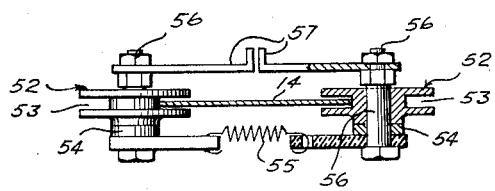
INVENTOR
LOUIS LASOWSKY
BY
ATTORNEY Oct. 25, 1932.  L. LASOWSKY  1,883,987
MOVING PICTURE CAMERA
Filed May 11, 1929   4 Sheets-Sheet 4
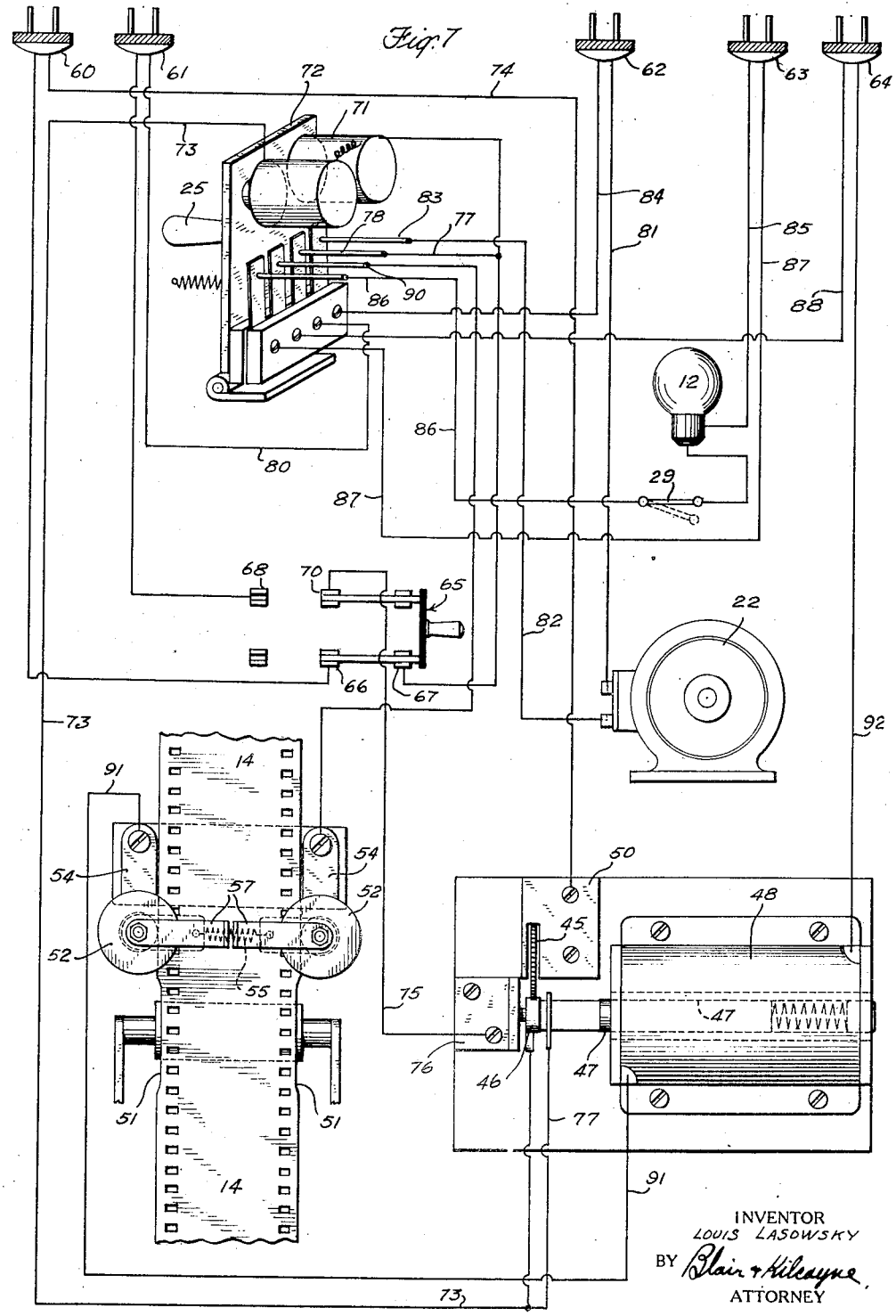

Patented Oct. 25, 1932

1,883,987

UNITED STATES PATENT OFFICE

LOUIS LASOWSKY, OF NEW YORK, N. Y.

MOVING PICTURE CAMERA

Application filed May 11, 1929. Serial No. 362,291.

This invention relates to improvements in moving picture machines and more particularly to a small, compact and self-contained apparatus especially designed for use in advertising schemes rather than with the large commercial machines used in moving picture houses.

One of the objects of the present invention is to provide an apparatus of the above general character, which with its film may be conveniently housed in a small fire-proof cabinet and exhibit a relatively large number of pictures upon a small adjacent screen.

A further object is to provide an apparatus of the above type which may be either continuously operated or coin-controlled, as desired, the film being preferably of the endless type whereby it may be intermittently stopped at any predetermined point.

A further object is to provide an apparatus of the above character, which may be easily and quickly converted from the continuous type to the coin-controlled type at will.

A further object is to provide an apparatus which will be reliable and efficient in use and provided with certain safety devices, which will instantly stop the machine and shut off the projecting light if the film becomes torn or broken.

A further object is to provide a machine of the above character which may be easily transported from one place to another and set up for operation by simply plugging in at the nearest electric light socket.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings, like characters of reference denote corresponding parts throughout all of the views, in which—

Fig. 1 is a side elevational view of the complete apparatus housed within a cabinet, one wall of the cabinet being removed so that the working parts may be more clearly seen;

Fig. 2 is an elevational detail view showing the film feed mechanism and one of the safety devices;

Fig. 3 is a view of the parts shown in Fig. 1 taken at right angles thereto, certain portions being shown in section;

Fig. 4 is an enlarged sectional detail of the coin control mechanism;

Fig. 5 is a vertical section thru part of the coin control mechanism, section being taken on line 5—5 of Fig. 4;

Fig. 6 is a detail view, partly in section, showing the safety switch mechanism;

Fig. 7 is an enlarged diagrammatic view showing the wiring scheme;

Fig. 8 is a small detail view showing the initial feed or re-wind film mechanism.

Referring now to the drawings in detail and more particularly to Fig. 1, 10 indicates the housing or cabinet in which the moving picture apparatus and film are housed. The front or one wall of the cabinet is removed in this view and the side walls shown in section so that the working parts contained therein may be more clearly seen. This cabinet, which is substantially a rectangular box, is preferably made of fire-proof material in order to comply with fire regulations, and is divided into upper and lower chambers provided with a transverse fire-proof partition 11.

In the upper chamber there is shown diagrammatically a projecting light 12 and projector and film feed mechanism 13, together with a shutter 19. These parts are of standard well known construction and require no detailed explanation, inasmuch as they form no part of the present invention except in so far, of course, as these elements enter broadly into certain combinations hereinafter set forth. It is sufficient to state that a film 14 is fed past the projecting light 12 and the pictures transmitted thru a hooded opening 15 at one side of the cabinet.

Below the transverse partition 11 is a film cabinet into and from which the endless film 14 is fed in the direction of the arrows, that is, after passing thru the projector mechanism 13, it passes down thru certain film feeding mechanism shown more clearly in Figs. 2 and 3, thence thru a guide 16 where it folds back and forth upon itself within a box 17, thence passes under a projecting guide 18 and upwardly at one side thru a channel 20, and thence outwardly under suitable rollers 21 to the film feed mechanism hereinafter described with relation to Figs. 2 and 3. The film feed mechanism is geared to the projector mechanism 13 and driven from a motor 22 having a belt or chain drive connection 23 with a pulley 24.

A master switch 25 controls a plurality of circuits as will be hereinafter described in connection with Fig. 7 for lighting the projector light 12, driving the motor 22, permitting actuation of a coin-controlled device shown in Figs. 4 and 5, as well as the safety switch device shown in Fig. 6, these parts all being so connected as to permit ready interchange from continuous drive to coin-controlled drive as desired. Also, if there should be a break in the film or other instrumentalities being operated to stop the drive of the film, then the projector light is automatically turned off and the motor stopped.

Taking up Figs. 2 and 3, that is, the film drive mechanism, it will be noted that the pulley 24 is mounted upon a shaft 26, the opposite end of which is provided with a gear 27 thereby to drive feed gears 28 and 30 in the same direction. This also meshes with a third pinion 31 controlling the drive of the projector mechanism 13 for feeding the film 14 past the projector light 12 in the well known manner.

It will be noted that the gears 28, 30 are mounted upon shafts 32, 33, respectively, these shafts being mounted in sliding blocks 34, 35 in a frame 36 and are normally held towards each other by means of springs 37, whereby the film 14 is gripped between feed rollers 38, 40. When a new film is being threaded thru the machine and into the film box 17, it is necessary to separate these rollers, and, for convenience of operation, levers 41 are mounted upon the bearings of rollers 38 whereby on depression of these levers, a cam surface 42 acts upon the shaft 32 or 33 to separate the rollers until a notch 43 engages the shaft of the movable roller to hold the pair 38, 40 in separated position.

Referring to Figs. 4 and 5 showing the coin-controlled apparatus, it will be noted that the cabinet is provided with a coin chute 44, and when a coin 45 is dropped down this chute, it will close a contact between the part 46 upon the core 47 of solenoid 48 and a contact member 50, (Fig. 4). When the circuit is closed by the coin, then the master switch 25 is actuated to start the machine, and it will run continuously until automatically stopped by means of the film control or break mechanism shown in Figs. 6 and 7.

Referring to these last mentioned figures, it will be seen that the film 14 is provided at the end of a series of pictures with two slightly narrowing portions 51 which are adapted to pass between the two guides 52 having guiding slots 53 as shown in Fig. 6. These guides 52 are mounted upon pivoted arms 54 and are normally urged towards each other by means of a very weak spring 55. The upper parts of the studs 56 carrying the guides 52 are provided with two contact arms 57 just clear of each other as shown in detail in Fig. 6. When the film with the narrow portions 51 passes thru the guides 52, then these tend to swing towards each other, thereby to carry the contact arms 57 into engagement with each other and close the circuit. Of course, the instant the contacts 57 close, then the motor will stop and the projecting light will be extinguished and the master switch 25 thrown out, but there will be sufficient momentum in the moving parts to carry the film into the position shown in Fig. 7 whereby the machine is again ready for operation on the insertion of a new coin. As will be hereinafter explained, the closing of the circuit by the arms 57 will also actuate the solenoid 48 to draw the core 47 inwardly and permit the coin 45 to drop into a suitable receptacle 58 therebelow, Fig. 1.

Having thus described the general structure of the entire machine, reference is now made to the circuit diagrammatically shown in Fig. 7. At the top of this view, there is indicated diagrammatically five plugs, 60, 61, 62, 63, 64, and it is of course to be understood that a complementary multiple socket connected to any suitable source of electric current is available. The plug 60 may be considered as being connected with the coin-controlled circuit while the plug 61 is substituted therefor in the same socket when it is desired to use the apparatus continuously. As these plugs 60 and 61 are interchanged, then of course a coin-controlled switch 65 is turned from one set of contacts 66, 67 to the other 68, 70.

Assuming first that the coin-controlled plug 60 is in use, then the current passes thru contacts 66, 67 to the master switch control solenoid 71 maintaining contact plate 72 in its raised position. The current then leaves the solenoid thru wire 73 ending at the contact 46 on the core of the solenoid 48, then thru the coin 45, terminal 50, and thence back thru wire 74. If, on the other hand, the plug 61 is in place, then the coin-controlled circuit is eliminated, and the current passes thru contacts 68, 70, the knife switch 65 being reversed from the position shown, thence thru wire 75 to terminal 76, the solenoid core 47 being in contact therewith, and thru metal clip in contact with the core by wire 77 which is spliced with the wire 73, thru the solenoids 71, controlling the master switch to the wire 77 connected with terminal 78 to the master switch. It leaves this terminal thru the wire 80 and thence back to the plug 61.

The plug 62 directly controls the motor, that is, one wire 81 leads to one side of the motor while the wire 82 leads to the terminal 83 of the master switch, thence back thru wire 84 to the plug. Thus, when the master switch 25 is broken by de-energizing the solenoid 71, then of course the motor 22 is stopped. Substantially the same arrangement is provided for the projecting light 12. Here the wire 85 leads to one terminal of the light, thence thru terminal 86 of the master switch 25 and back thru wire 87 to the plug 63.

The plug 64, which may be considered the "break" circuit, or film feed stopping means, is provided with a wire 88 leading through terminal 90 of the master switch 25, thence to the contact switch 57 which, when closed, completes the circuit thru the opposite wire 91 to the coil of the solenoid 48, thence out thru the wire 92 back to the plug 64. Thus, it will be seen that if the narrow portion 51 of the film or any break in the film causes a closing of the circuit at the point 57, the solenoid coil 48 will be energized to break the contact between 76 and 46 or allow the dropping of the coin 45 to break the circuit between 46 and 50. In either case, a breaking of this circuit reacts upon the master switch 25 to cause a breaking of all four contacts associated therewith. A film generally breaks or tears first substantially parallel to one edge and not across. Thus the edge contacts 52 are most efficient. The light circuit 12—63 may be provided with an auxiliary control switch 29 if desired.

Reference is briefly made to Fig. 8 of the drawings wherein is shown a convenient means of re-winding the film or inserting a new film. The motor 22 and belt drive 23 is provided with a clutch 93 which may be thrown in and out at will, thereby to connect a second pulley 94 for driving belt 95 and outside reel 96 shown in dotted lines in Fig. 1 supported from a bracket 97 on the outside of the cabinet. Thus when a new film is to be inserted, the reel 96 is positioned in the manner shown in Fig. 1, the clutch 93 being actuated after first threading the feed rollers shown in Figs. 2 and 3. When the film is removed from the casing, the reverse of course takes place.

From the above, it is believed that the construction and operation of the present device will be clear to those skilled in the art. The operation merely provides for the insertion of either plugs 60 or 61 into the desired socket and the manual actuation of the switch 65 according to whether the device is to be used continuously or as a coin-controlled mechanism. The other plugs 62, 63, 64 are of course maintained in their respective sockets. Thus a break in the film will instantly stop the entire apparatus and turn off the projecting light if used in one way, while the insertion of a coil will automatically start the apparatus until the film makes a complete predetermined run whereupon the entire mechanism is stopped.

The invention is of such simple and practical construction that it may be easily, compactly and conveniently housed in a suitable casing and readily transported from one place to another. It is thus seen that the present invention comprehends an apparatus well adapted to accomplish, among others, the objects and advantages herein set forth.

Without further analysis the foregoing will so fully reveal the gist of this invention that others can by applying current knowledge readily adapt it for various applications without omitting certain features that from the standpoint of the prior art fairly constitute essential characteristics of the generic or specific aspects of this invention, and therefore such adaptations should and are intended to be comprehended within the meaning and range of equivalency of the following claims.

I claim:

1. In a moving picture apparatus, in combination, a motor and projecting apparatus, a coin-controlled apparatus therefor, and an automatic stop apparatus for controlling said motor, separate circuits for each of said individual parts adapted to be connected with a common source of current, and a master switch thru which all of said independent circuits pass, said automatic stop apparatus including means adapted to close one of said circuits on breaking of the film to actuate said master switch.

2. In a moving picture apparatus, in combination, a motor and projecting apparatus, a coin-controlled apparatus therefor, and an automatic stop apparatus for controlling said motor, separate circuits for each of said individual parts adapted to be connected with a common source of current and a master switch thru which all of said independent circuits pass, said coin-controlled apparatus including means for closing one of said circuits as by means of a coin for actuating said master switch.

3. In a moving picture apparatus, in combination, a motor and projecting apparatus, a coin-controlled apparatus therefor, and an automatic stop apparatus for controlling said motor, separate circuits for each of said individual parts adapted to be connected with a common source of current, and a master switch thru which all of said independent circuits pass, said coin-controlled apparatus including means for closing one of said circuits as by means of a coin for actuating said master switch, and means associated with the film for closing another of said circuits for opening the master switch after the film has made a predetermined run.

Signed at New York, New York, this 4th day of May, 1929.

LOUIS LASOWSKY.